United States Patent [19]
Foster

[11] 3,760,571
[45] Sept. 25, 1973

[54] RECIPROCATING SICKLE ASSEMBLY
[75] Inventor: Douglas E. Foster, Racine, Wis.
[73] Assignee: Wm. Didier Mfg. Co., Racine, Wis.
[22] Filed: Nov. 6, 1972
[21] Appl. No.: 304,019

[52] U.S. Cl. ................................................ 56/298
[51] Int. Cl. .......................................... A01d 55/02
[58] Field of Search ............................... 56/296–313

[56] References Cited
UNITED STATES PATENTS

| | | | |
|---|---|---|---|
| 960,874 | 6/1910 | Flora | 56/305 |
| 1,243,095 | 10/1917 | Patterson | 56/297 |
| 1,869,981 | 8/1932 | Paradise | 56/307 X |
| 2,528,659 | 11/1950 | Krause | 56/298 |
| 3,098,338 | 7/1963 | Myers | 56/296 |
| 3,199,279 | 8/1965 | Yeske | 56/305 |

FOREIGN PATENTS OR APPLICATIONS

| | | | |
|---|---|---|---|
| 143,595 | 9/1951 | Australia | 56/296 |
| 601,582 | 2/1960 | Italy | 56/299 |

Primary Examiner—Russell R. Kinsey
Attorney—James E. Nilles

[57] ABSTRACT

A sickle assembly of the type having a plurality of knife blades which reciprocate against corresponding shear plates to provide a cutting action for the assembly as it moves over a crop, such as grass. The shear plates are fully supported on a single support bar having forwardly projecting and generally triangularly shaped portions, one for firmly supporting each of the shear plates rigidly mounted thereto.

9 Claims, 5 Drawing Figures

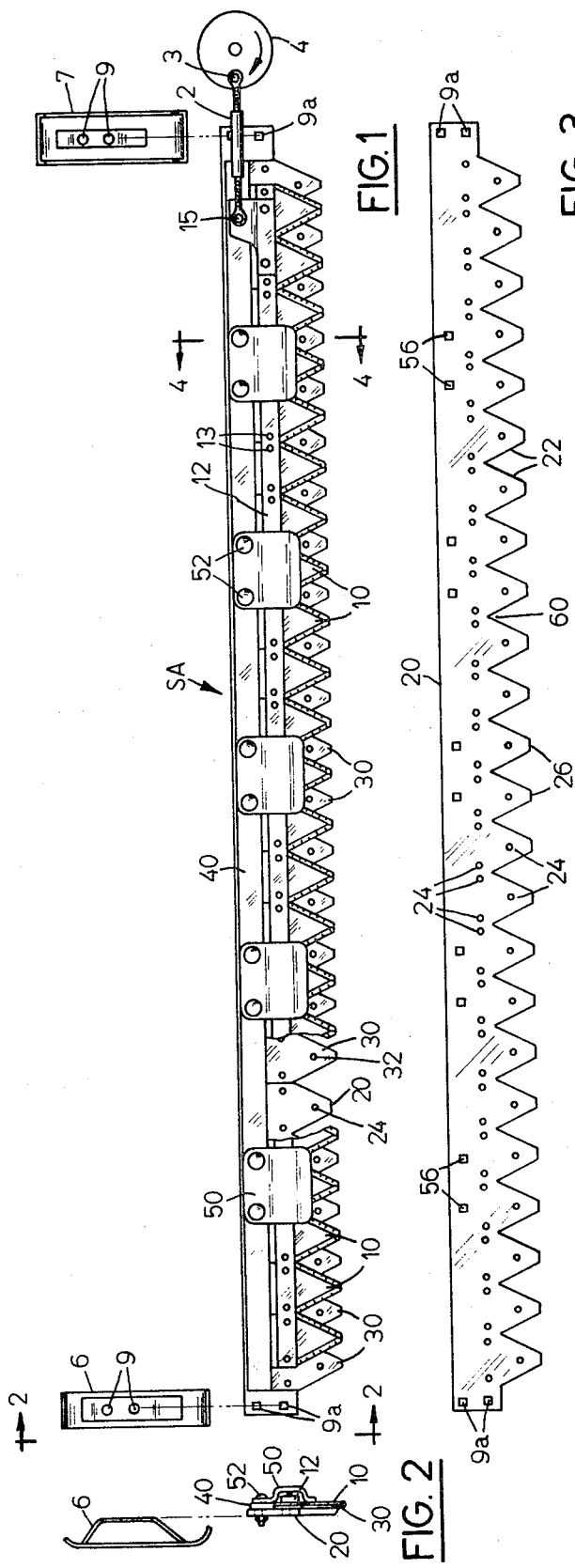
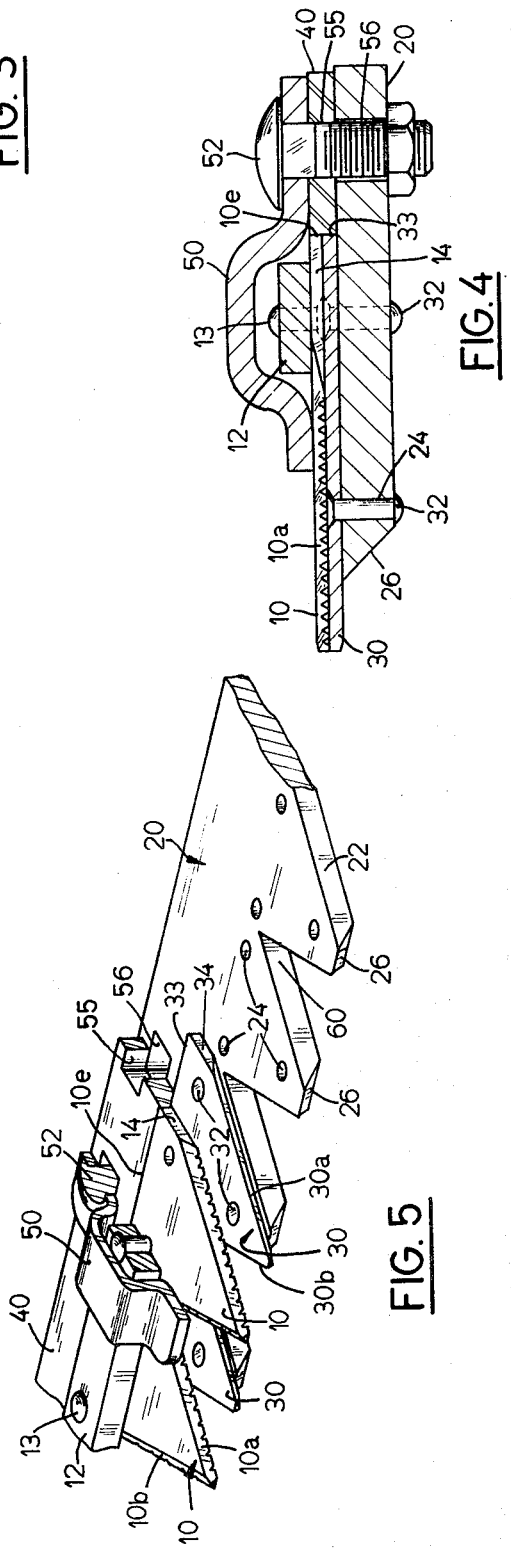

RECIPROCATING SICKLE ASSEMBLY

BACKGROUND OF THE INVENTION

Various means have been provided throughout the years in sickle cutting mechanism for forming and supporting the shear plates or shear edges which cooperate with the reciprocating knife blades. For example, forwardly extending guards were used having ledger plates and the knife blades reciprocated within the guards and over the ledger plates. Such guards were used primarily to protect the sickle sections from damage due to hitting obstructions. More recently it has been proposed to eliminate the need for such sickle guards and instead triangularly shaped shear plates were secured in side-by-side relationship to extend forwardly of a support bar, such as shown in the U.S. Pat. No. 3,098,338 issued July 23, 1963 to Myers.

Another example of the prior art which utilized sickle sections without the use of guards is shown in the U.S. Pat. No. 3,108,421 which issued Oct. 29, 1963 to Leverenz and in which a double sickle was employed, the sickles both reciprocating in opposition to one another.

Certain shortcomings were encountered in the prior art devices when it was attempted to use them without the conventional, forwardly extending sickle guards and one of these shortcomings was the damage done to the sickle sections when obstructions were encountered and due to the fact that the shear plates were inadequately supported or protected.

SUMMARY OF THE INVENTION

The present invention provides a reciprocating sickle assembly having a single support bar extending for the length of the sickle assembly, and which support bar has forwardly extending and generally triangularly shaped portions, each of which firmly and completely support a generally complementary shaped shear plate which is riveted or otherwise secured to the top side of said portions. A wear plate is rigidly secured to the support bar and directly behind the shear plates and abuts against the latter to further rigidify the mounting of the shear plates on the support bar. A series of knife blades which are generally of complementary shape to the shear plates, are all rigidly secured to a knife bar, the knife bar and its knife blades then reciprocating over the shear plates to provide the cutting action. The knife bar and knife blade assembly is held downwardly firmly by hold down clips so as to cause the knife blades to abut against the shear plates for proper cooperative cutting action. The hold down clips, wear plate and support bar are all rigidly held together by carriage bolts or the like.

Thus, a very economically produced sickle bar assembly is provided having a minimum number of parts, but yet insuring that the shear plates are fully supported and adequately protected against damage.

These and other objects and advantages of the present invention will appear hereinafter as this disclosure progresses, reference being made to the accompanying drawing.

BRIEF DESCRIPTION OF THE DRAWINGS

FIG. 1 is a plan view of a reciprocating sickle assembly, certain parts being shown as broken away for clarity in the drawings and other parts being shown as removed from the assembly;

FIG. 2 is an end view of the assembly and taken generally along the line 2—2 in FIG. 1;

FIG. 3 is a plan view of the support bar shown in FIG. 1;

FIG. 4 is a transverse, cross sectional view taken generally along the line 4—4 in FIG. 1, but on an enlarged scale; and FIG. 5 is a fragmentary, perspective view of the device shown in FIG. 1, but on an enlarged scale, certain parts being shown as broken away or in section for the sake of clarity.

DESCRIPTION OF A PREFERRED EMBODIMENT

The sickle assembly SA is shown generally in FIG. 1 and is adapted to be connected by the Pitman or connecting link 2 to the eccentrically mounted post 3 on a rotatably driven member 4. Any suitable means may be provided for driving member 4, such as a hydraulic or other means (not shown). The sickle assembly is adapted to travel over the ground to sever the crop and the present invention finds particular utility for cutting grasses or the like. The sickle assembly has a pair of ground engaging shoes 6 and 7, one on either end and which shoes are rigidly secured to the ends of the sickle assembly by means of bolt means 9. The bolt means 9 also extends through aligned square apertures 9a in the support bar now to be described.

A series of conventional knife blades 10 of generally triangular configuration are rigidly secured to the underside of a knife bar 12 by rivets 13. The knife blades have flat sides 14 so that they can abut against one another at the sides to further enhance their rigidity with the knife bar 12. The connecting link 2 is pivotally connected by the bolt 15 to the inner end of the knife bar 12 and thereby the assembled knife blades and the knife bar reciprocate rapidly.

A single support bar 20, made of steel, extends for the entire length of the sickle assembly and along its front edge has a series of generally triangularly shaped portions 22 extending forwardly therefrom. Each of these portions 22 have a series of holes, for example the three holes 24 shown. The forwardmost part 26 of portions 22 are inclined rearwardly and downwardly so as to present a generally flat and downwardly extending surface at the forwardmost point of portions 22. This flat surface aids in enabling the sickle assembly to move over the ground and avoid obstructions.

A series of shear plates 30 are rigidly secured along the upper side of the support bar 20 by means of rivets 32. More specifically, the shear plates are generally triangular in shape and complementary in respect to the shape of the knife blades 10. However, it will be noted that knife blades 10 have their rearwardly diverging, inclined surfaces 10a and 10b formed in serrations, while the rearwardly and converging downwardly bevelled surfaces 30a and 30b of the shear plates are of smooth or unserrated design.

The rear side 33 of the shear plates is flat and abuts snugly against a wear plate 40 which is rigidly fastened to the upper side of the support bar and extends coextensively along the length thereof. In this manner, the shear plates are further rigidly secured in place on the top of the support bar 20. The shear plates 30 also have opposed flat sides 34 so that the wear plates abut tightly against one another when assembled to further rigidify their mounting on the support bar 20.

The assembled knife blades reciprocate along the top side of the flat shear plates 30 and bear firmly against the shear plates so that the rearwardly inclined edges of the knife blades and shear plates cooperate to provide a cutting action in the known manner.

Hold down clips 50 are rigidly secured at their rear side to the upper surface of the wear plate 40 by means of the carriage bolts 52 which extend through the clips 50, through the square holes 55 in the wear plate which are aligned with the round holes 56 in the support bar. Thus, the hold down clips, the wear plate, and the support bars are all rigidly secured together.

As the knife blade and knife bar assembly reciprocate, the hold down clips hold the blades firmly against the shear plates and the rear edges 10e of the knife blades bear firmly and in sliding and guiding engagement with the forward side of the wear plate 40.

In operation, the shear plates 30 are rigidly and substantially supported by the forwardly extending, generally triangularly shaped portions 22 of the support bar. This construction and arrangement prevents the shear plates from distorting even though they may be in forwardly over-hanging position. If an obstruction is encountred by the sickel assembly provided by the present invention, the support bar will absorb the thrust of the obstructions even though the obstruction may enter the V-shaped opening 60 (FIG. 5) formed between the forwardly extending portions 22 of the support bar.

Thus, the present invention provides a rather lightweight and economically produced sickle assembly having a minimum number of parts, yet at the same time insuring complete cutting alignment between the plates and blades and also insuring protection of the cutting parts.

I claim:

1. In a reciprocating type sickle comprising a support bar extending for the length of the assembly and having a flat upper surface and also having a plurality of forwardly extending and generally triangularly shaped portions along its front edge, a generally triangularly shaped shear plate rigidly secured to the upper side of each of said portions, each of said shear plates having a straight rear side, a wear plate rigidly secured to the upper side of said support bar and snugly against the rear side of said shear plates so as to provide a rearward thrust absorbing means for said shear plates, a reciprocating knife assembly adapted to be mounted on said shear plates and reciprocated thereacross for cooperative cutting action therewith and also adapted to abut against said wear plate whereby said wear plate absorbs the rearward thrust of said knife assembly; said knife assembly comprising a plurality of generally triangular knife blades which generally complement the shape of said shear plates, a knife bar, said blades rigidly secured adjacent their rearward side to said knife bar whereby said knife bar and knife plates reciprocate as a unit over said shear plates; and hold down means mounted on said support bar for holding said knife assembly in proper cutting cooperation with said shear plates.

2. The assembly set forth in claim 1 wherein said hold down means, said wear plate, and said support bar are all rigidly secured together by bolt means.

3. The assembly set forth in claim 1 wherein said forwardly extending portions of said support bar have their forwardmost end formed as a rearwardly and downwardly inclined surface.

4. The assembly set forth in claim 1 wherein said knife blades are of type having rearwardly diverging, bevelled surfaces of serrated construction, and said shear plates have rearwardly diverging bevelled surfaces of unserrated construction.

5. The assembly set forth in claim 1 including a ground engaging shoe at each end of said sickle assembly and means for rigidly securing said shoes to the ends of said support plate.

6. In a reciprocating type sickle comprising a support bar extending for the length of the assembly, a ground engaging show secured directly to each end of said support bar, said support bar having a flat upper surface and also having a plurality of forwardly extending and generally triangularly shaped portions along its front edge, a generally triangularly shaped shear plate rigidly secured to the upper side of each of said portions and having a shape substantially the same as that of said support bar portions for being supported thereby, each of said shear plates having a straight rear side, a wear plate rigidly secured to the upper side of said support bar and snugly against said rear side of said shear plates so as to provide a rearward thrust absorbing means for said shear plates, a reciprocating knife assembly adapted to be mounted on said shear plates and reciprocated thereacross for cooperative cutting action therewith and also adapted to abut against said wear plate whereby said wear plate absorbs the rearward thrust of said knife assembly; said knife assembly comprising a plurality of generally triangular knife blades which generally complement the shape of said shear plates, a knife bar, said blades rigidly secured adjacent their rearward side to said knife bar whereby said knife bar and knife plate reciprocate as a unit over said shear plates; hold down clips mounted on said wear plate for holding said knife assembly in proper cutting cooperation with said shear plates; and bolt means extending through said clips, said wear plate and said support bar for rigidly but detachably securing them together.

7. The assembly set forth in claim 6 wherein said forwardly extending portions of said support bar have their forwardmost end formed as a rearwardly and downwardly inclined surface.

8. The assembly set forth in claim 6 wherein said knife blades are of the type having rearwardly diverging, bevelled surfaces of serrated construction, and said shear plates have rearwardly diverging bevelled surfaces of unserrated construction.

9. The assembly set forth in claim 7 wherein said knife blades are of the type having rearwardly diverging, bevelled surfaces of serrated construction, and said shear plates have rearwardly diverging bevelled surfaces of unserrated construction.

* * * * *